US007270481B1

(12) United States Patent
Chang

(10) Patent No.: US 7,270,481 B1
(45) Date of Patent: Sep. 18, 2007

(54) PLAIN BEARING FEEDING MECHANISM FOR FOOD SLICER

(76) Inventor: Ching T. Chang, 1074 E. Walnut St., Westerville, OH (US) 43081

( * ) Notice: Subject to any disclaimer, the term of this patent is extended or adjusted under 35 U.S.C. 154(b) by 20 days.

(21) Appl. No.: 10/924,577

(22) Filed: Aug. 24, 2004

(51) Int. Cl.
*F16C 29/04* (2006.01)
*B26D 7/06* (2006.01)

(52) U.S. Cl. ......................... 384/50; 384/58; 83/436.1; 83/706; 83/932

(58) Field of Classification Search .................. 384/50, 384/53, 58; 193/37, 35 R; 83/703-731, 83/932, 436.1
See application file for complete search history.

(56) References Cited

U.S. PATENT DOCUMENTS 2,103,567 A * 12/1937 Van Berkel .................. 83/729
2,196,371 A * 4/1940 Berkel ......................... 83/713
2,752,968 A 7/1956 Toby
2,768,666 A 10/1956 Garapolo
3,105,533 A 10/1963 Hensgen
3,938,602 A 2/1976 Sly
4,794,996 A 1/1989 Wallace
4,813,316 A 3/1989 Johnson
5,697,275 A 12/1997 Lindee
6,193,043 B1 * 2/2001 Langston et al. ....... 193/35 SS

OTHER PUBLICATIONS

BERKEL Web Catalog, South Bend, IN, USA Model 909E, Manual Gravity Feed Slicer, no date.
BERKEL Web Catalog, South Bend, IN, USA Model 919A, Automatic Gravity Feed Slicer, no date.
GLOBE Web Catalog, Dayton, OH, USA Model 4600 Manual Slicer, no date.
GLOBE Web Catalog, Dayton, OH, USA Model 4850/4975 Automatic Slicers, no date.
HOBART Web Catalog, Troy, OH, USA Model 2612 Slicer (Manual), no date.
HOBART Web Catalog, Troy, OH, USA Model 2912 Slicer (Automatic), no date.

* cited by examiner

*Primary Examiner*—Thomas R. Hannon

(57) ABSTRACT

A removable, lubrication free plain bearing plate constructed food-table is assembled on the food slicer to reduce the operating friction while increasing the unique quality of the sliced food product as well as labor-efficiency.

6 Claims, 8 Drawing Sheets

PLAIN BEARING FEEDING MECHANISM FOR FOOD SLICER

CROSS-REFERENCES

None.

FIELD OF THE INVENTION

The present invention provides a lubrication free plain bearing feeding mechanism for food slicing equipment generally related to the food and meat industries. More particularly, the invention relates to a manually-operated food slicer to prepare sliced food products with the advantage of unique quality and labor-efficiency.

BACKGROUND OF THE INVENTION

Manually-operated food slicers have been used in restaurants and food markets for many years to slice food products with the result of uneven product thickness, operating inconvenience and labor inefficiency, especially for the daily demand of considerable quantities.

A manually-operated food slicer is basically equipped with a motor-driven inclined (usually about 45 degree to vertical) circular knife, an inclined (same inclined angle as the circular knife) food-table and table-frame assembly, a slice-gauge adjusting mechanism, and a reciprocally movable food-carriage. The food-table and table-frame assembly is fastened on a mounting block that connects to the slice-gauge adjusting mechanism by a precision gear and guide system to adjust the food-table to a certain distance related to the circular knife for a desire food slice thickness. The food-carriage is mounted for lateral movement in a linear path to feed the food product, which is loaded on the food-table, into contact with the circular knife to produce food slices. The food-carriage usually includes an automatic down-feeding press-arm to keep the product loaded against the food-table while the food-carriage moves the product along its path to cut the slices to a consistent thickness after the operator sets the desired thickness on the machine's slice-gauge adjuster. But often, the cutting thickness of a slicer cannot be kept consistent as desired because of the inconstant sliding friction created by the loaded food, which is relatively soft and travels back and forth on the food-table controlled by the food-carriage that is pushed and pulled by the operator during the cutting process. Unlike two ridge bodies, the slide movement between a soft but dense body, as meat products, and a hard body, as the metal food-table, not only generates greater friction but also creates uneven and inconstant friction, unless the driving force is uniformly spread on the soft body during the action. Although the current food-tables have shallow lateral slots for the purpose of reducing some of the slide friction in the cutting process, they can only help to a certain degree, especially when there is uneven and inconstant friction between the food and the food-table, since the driving force acting on the food through the food-carriage is not uniformly spread. This uneven and inconstant slide friction between the food and food-table gradually changes the movement and position of the loaded food in the cutting process and causes the food slicer to produce slices with uneven thickness, even a single slice may vary in thickness. This uneven and inconstant sliding friction becomes more noticeable when the loaded food is heavier and wetter, which causes the loaded food gradually being inclined on the food table, regardless the limited restriction of the food-carriage, to eventually jam the food in the gap between the food-table and the food-carriage. In this situation, more force must be supplied on the food-carriage by the operator to keep the food moving, and frequently, more time is wasted by the operator to reset the slice gauge to the desired product thickness, but often the uneven and inconstant friction prohibits the operator from controlling the thickness of the slices.

U.S. Pat. No. 2,768,666 issued in the name of Garapolo and assigned to Wilson & Co. discloses an automatic slice thickness control method by adding a hydraulic system with the relative mechanisms, including cylinder, valve, link-rod, etc., to the food-carriage to control the feed speed of a bacon slicing machine, which in turn controls the slice thickness. U.S. Pat. No. 3,938,602 to Sly et al. illustrates a scale method to control the slice product portion weight, but not to control the thickness of the slice products. U.S. Pat. No. 4,813,316 issued in the name of Johnson and assigned to Hobart Corporation illustrates a method by using an electric motor to drive the food-carriage to control the slice products. None of these methods or devices is capable of changing the uneven and inconstant slide friction of the food slicer, which is the main cause of the product slice quality and operating inconvenience and inefficiency.

Accordingly, the primary object of the present invention is to provide a new lubrication free plain bearing feeding mechanism for the food slicer, especially for the manually-operated food slicer to solve the large and uneven slide friction problems while significantly improve the quality and the function of the food-slicing machine.

Another object of the present invention is to provide a new apparatus that will reduce the food sliding friction and food inclined situation in the cutting process for the automatic power driven carriage food slicer as well as reducing the driving force, yet producing high quality food slice products.

The further object of the present invention is to provide a new apparatus that will reduce the waste of the food product, which is loaded on the slice machine, as friction reduction improves gauge reliability such that the necessity of a slice thickness-testing sample is eliminated.

SUMMARY OF THE INVENTION

The plain bearing feeding mechanism of the present invention is basically comprised of a food-table and a table-frame assembly incline mounted on the food slicer providing with a shallow, rectangular cavity on the upper surface of the assembly to precisely nest a bearing assembly plate having the upper surface flush with that of the food-table. The said bearing assembly plate is comprised of a rectangular shape bearing mounting plate having multitude open slots arranged in columns to nest multitude bearing sets with their round tops slightly higher than the upper surface of the plate on a number of metal rods which are individually aligned with the centerlines of each column of open slots in the plate. Each of said columns on the bearing mounting plate is, when the plate is precisely nested in the food-table and table-frame assembly, individually perpendicular to the moving path of the food-carriage while each of said bearing sets includes at least one sleeve bearing and can rotate in the slot it nests. In order to utilize standard parts, each bearing set preferably includes two standard lubrication free non-metal sleeve bearings in the middle and another two non-standard end-bushings at the ends. The end-bushings are preferably configured to have profile and size close to that part of the slot where they nest but slightly thinner than the thickness of the sleeve bearings, such to keep them from rotating in the slot they are nested during the cutting process and lower than the round top of the sleeve bearings.

For safety, the bearing assembly plate is interlocked when it nests in the cavity of the food-table and table-frame assembly. The interlock mechanism is furnished by two neck-pins, which are pressed and riveted on the bearing mounting plate to keep them from dropping out, engaging with two keyholes on the table-frame to prevent the bearing assembly plate from being pulled out of the cavity in food-table and table-frame assembly by accident. Force must be applied through a given access, the hole located at the top edge of the cavity on the food-table and table-frame assembly, to separate the bearing assembly plate from the food-table and table-frame assembly and then to remove it.

In the cutting process, the effect of supporting the loaded food by the multitude sleeve bearings with rolling friction, reduces the majority of initial slide friction including a large part of the uneven and inconstant friction so that the operator can move the loaded food smoothly from the bearing food-table through the food-carriage to slice the food product in a satisfactory, unique, and consistent thickness.

DETAIL DESCRIPTION

Figure 1:
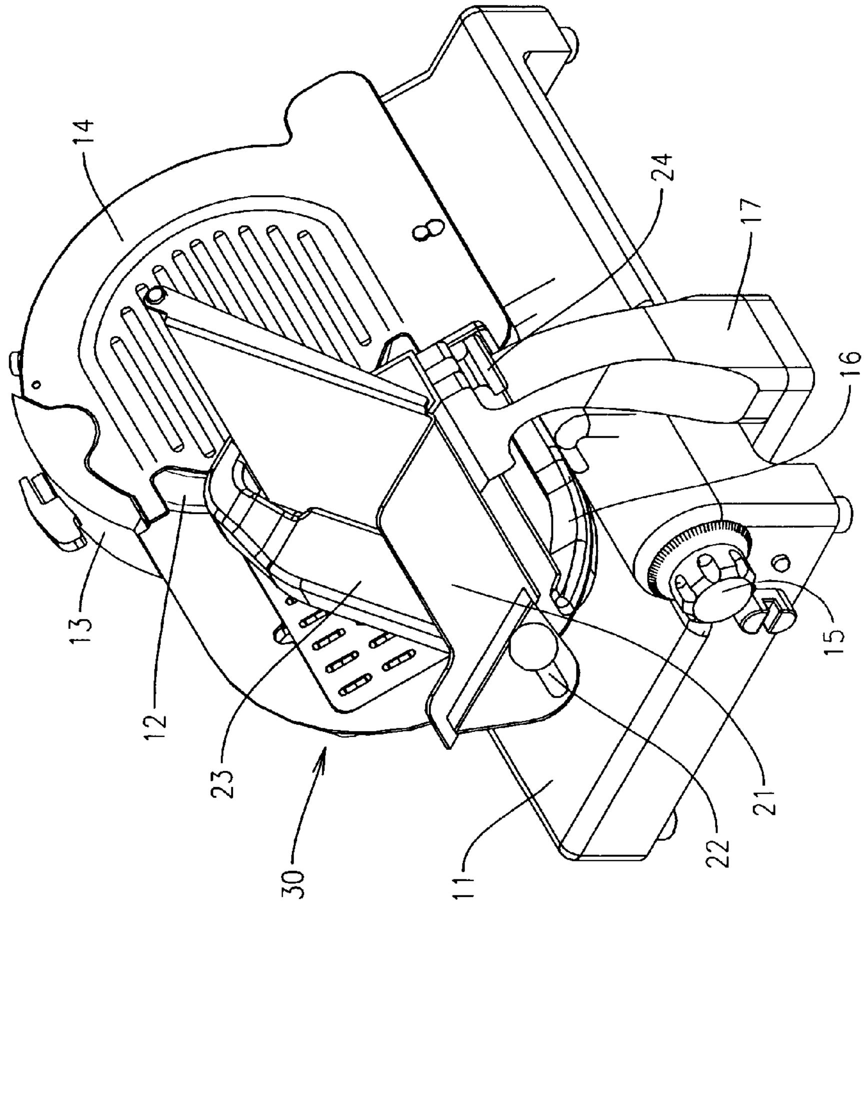
FIG. 1 is an isometric view of a typical manually-operated food slicer with the present invention assembled on it.

FIG. 1 illustrates a typical manually-operated food slicer with the present invention assembled on it. As illustrated, a manually-operated food slicer is comprised of a machine base 11 including a build-in slice gauge adjust mechanism with knob 15 exposed in the front of the machine, a 45-degree to vertical inclined motor-driven circular knife 12 with an attached knife sharpener mechanism 13 and a knife safety cover 14, a carriage-mounting arm 17, a food-carriage 21 with its operating handle 22, feed press-arm 23, and mounting knob 24 as a whole package, and the plain bearing feeding mechanism 30, the present invention, which is 45 degree to vertical inclined and fastened to the mounting block 16 that connects to the slice gauge adjusting mechanism on the machine.

Figure 2:
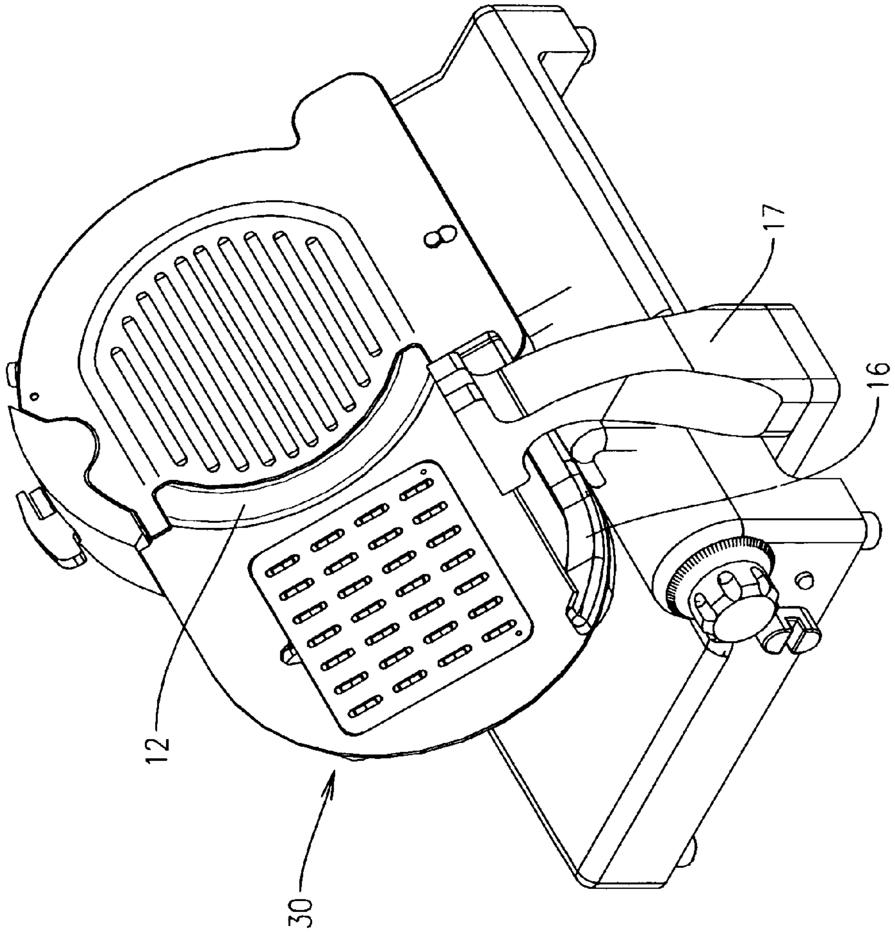
FIG. 2 is an isometric view of a typical manually-operated food slicer with the present invention assembled on it but without a food-carriage.

FIG. 2 more clearly illustrates the position of plain bearing feeding mechanism 30, the present invention, on a typical manually-operated food slicer with the food-carriage 21 and the related parts on it illustrated in FIG. 1 removed from the carriage-mounting arm 17. As shown, the bearing feeding mechanism 30 is 45 degree to vertical inclined, positioned close to the circular knife 12, and fastened to the mounting block 16.

Figure 3:
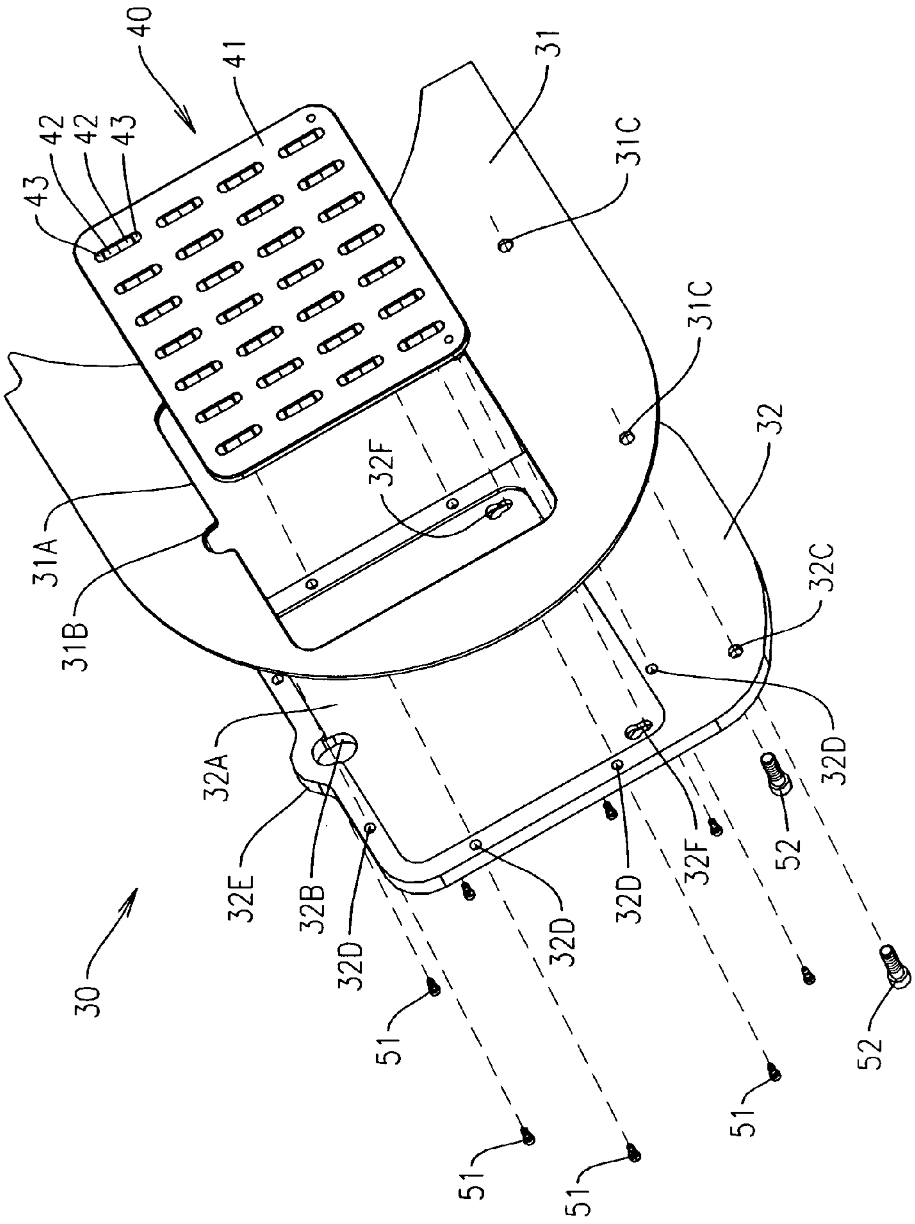
FIG. 3 is an exploded view of the present invention seen from the front.
Figure 4:
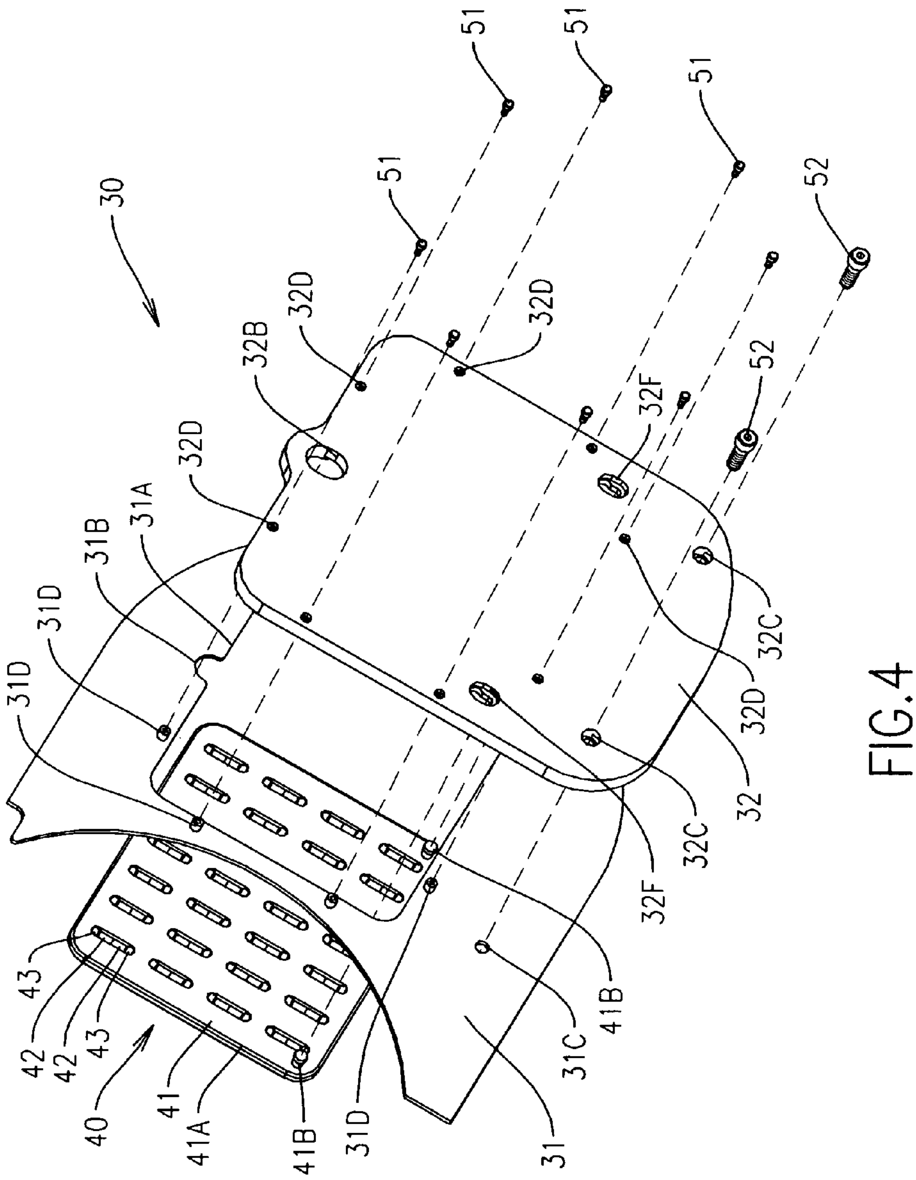
FIG. 4 is an exploded view of the present invention seen from the back.
Figure 5:
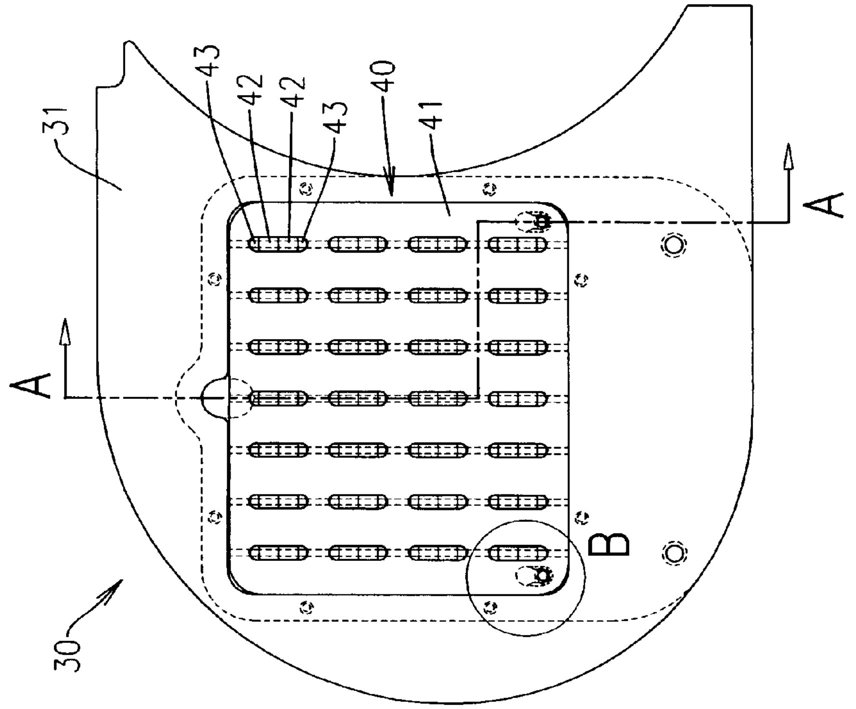
FIG. 5 is a plain view of the present invention.
Figure 6A:
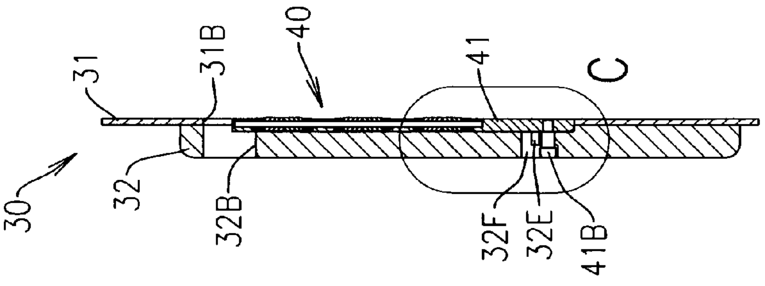
FIG. 6A is a section view through line A-A of FIG. 5.
Figure 6B:
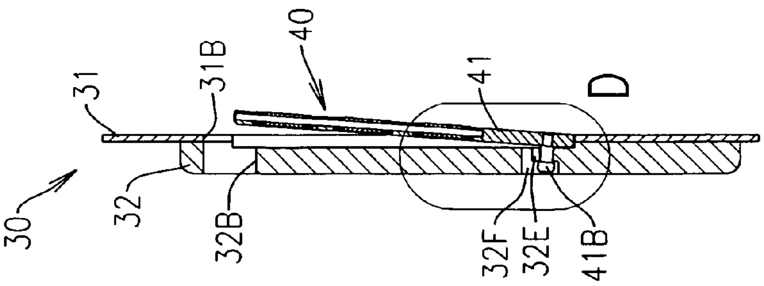
FIG. 6B is a section view through line A-A of FIG. 5 with the bearing assembly plate apart and the upper edge outside of its nest.
Figure 7:
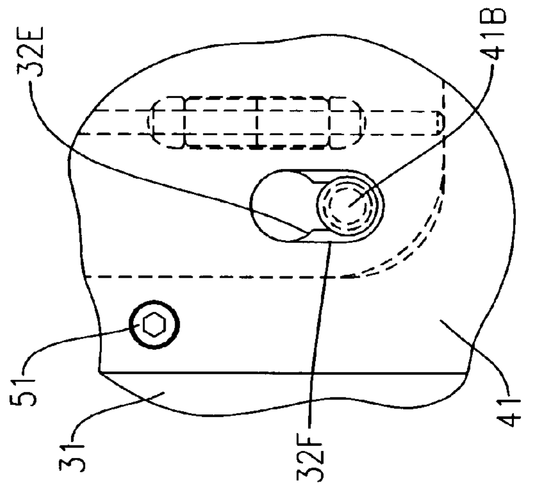
FIG. 7 is an enlarged partial back view of circle B of FIG. 5.

FIGS. 3 through 4 illustrates the exploded view of the plain bearing feeding mechanism 30, the present invention, seen from front and back, respectively. This present invention is mainly comprised of a food-table 31, a table-frame 32, and a bearing assembly plate 40 which is nested in the tighten table 31 and frame 32 assembly as unexploded. The food table 31, as illustrated in FIG. 3 and FIG. 4, is a thin and flat metal plate, preferably to have a round-corner rectangular cutout 31A for the nest of the bearing assembly plate 40, also, preferably to have a curved edge 31E for the clearance of the assembly near to the circular knife 12 as illustrated in FIG. 1 and FIG. 2. As illustrated, the table-frame 32 is a thick metal plate having a shallow, round-corner rectangular recess 32A with precision depth on the upper surface of the frame to match the said cutout of food-table 31, such that when frame 32 and table 31 are tighten together it can nest the bearing assembly plate 40 precisely. The bearing assembly plate 40 includes a bearing mounting plate 41 having a preferable number of twenty-eight open slots arranged in seven columns and twenty-eight sets of nested bearings. Each bearing set is preferably to have two sleeve bearings 42 in the middle and two end-bushings 43 at the ends as seen. The leading chamfer 41A all around the rectangular sides of bearing mounting plate 41 shown in FIG. 4 is for facilitating installation of the plate.

Further, the two keyholes 32E on table-frame 32 are the accesses and locks for the two neck pins 41B on the back side of bearing mounting plate 41 when plate 41 is nested in the cavity of food-table 31 and table-frame 32 assembly. The two slots 32F on the backside of keyholes 32E are used for flush pins 41B with frame 32 when they are locked in keyhole 32E. Half-slot 31B and slot 32B on food table 31 and table frame 32, respectively, are the access to separate and remove bearing mounting plate 41 from its nest. Food-table 31 and table-frame 32 can be tighten together by the eight screws 51 to the eight round nuts 31D on the back of food table 31 through counter bored holes 32D around frame 32. The assembly of food-table 31 and table-frame 32 can be mounted on the table-block 16 illustrated in FIG. 1 and FIG. 2 by screws 52 through holes 31C and 32C on table 31 and frame 32, respectively.

Figure 8A:
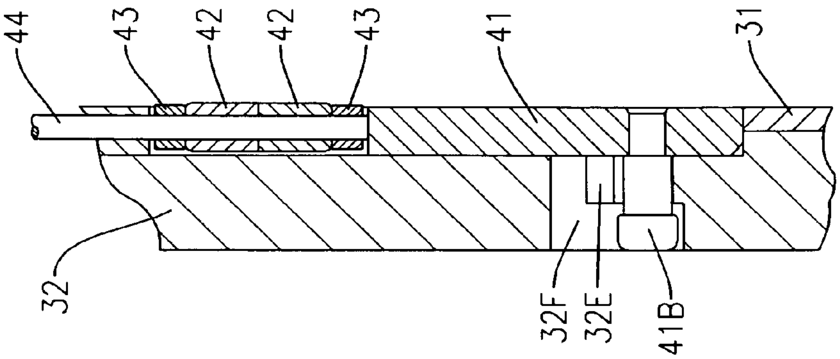
FIG. 8A is an enlarged partial view taken at contour C of FIG. 6A.
Figure 8B:
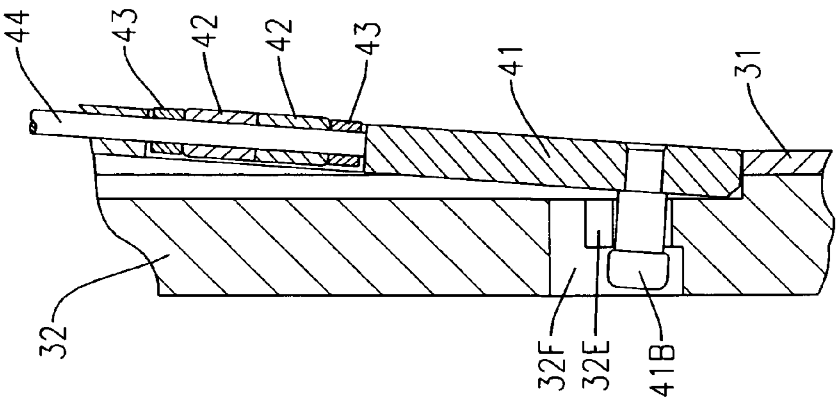
FIG. 8B is an enlarged partial view taken at contour D of FIG. 6B.

FIGS. 5 through 8B more clearly illustrate the preferred construction of the neck pin 41B on bearing mounting plate 41 snapped in the keyhole 32E with the head sunk in backside slot 32F on table-frame 32 and flush with the frame. Clearance is necessary between the head of pin 41B and the keyhole 32E for the movement of plate 41. FIGS. 8A through 8B also more clearly illustrate the preferred construction of one of the bearing sets: two sleeve bearings 42 and two end-bushes 43 are assembled on rod 44, that is inserted in plate 41.

Figure 9:
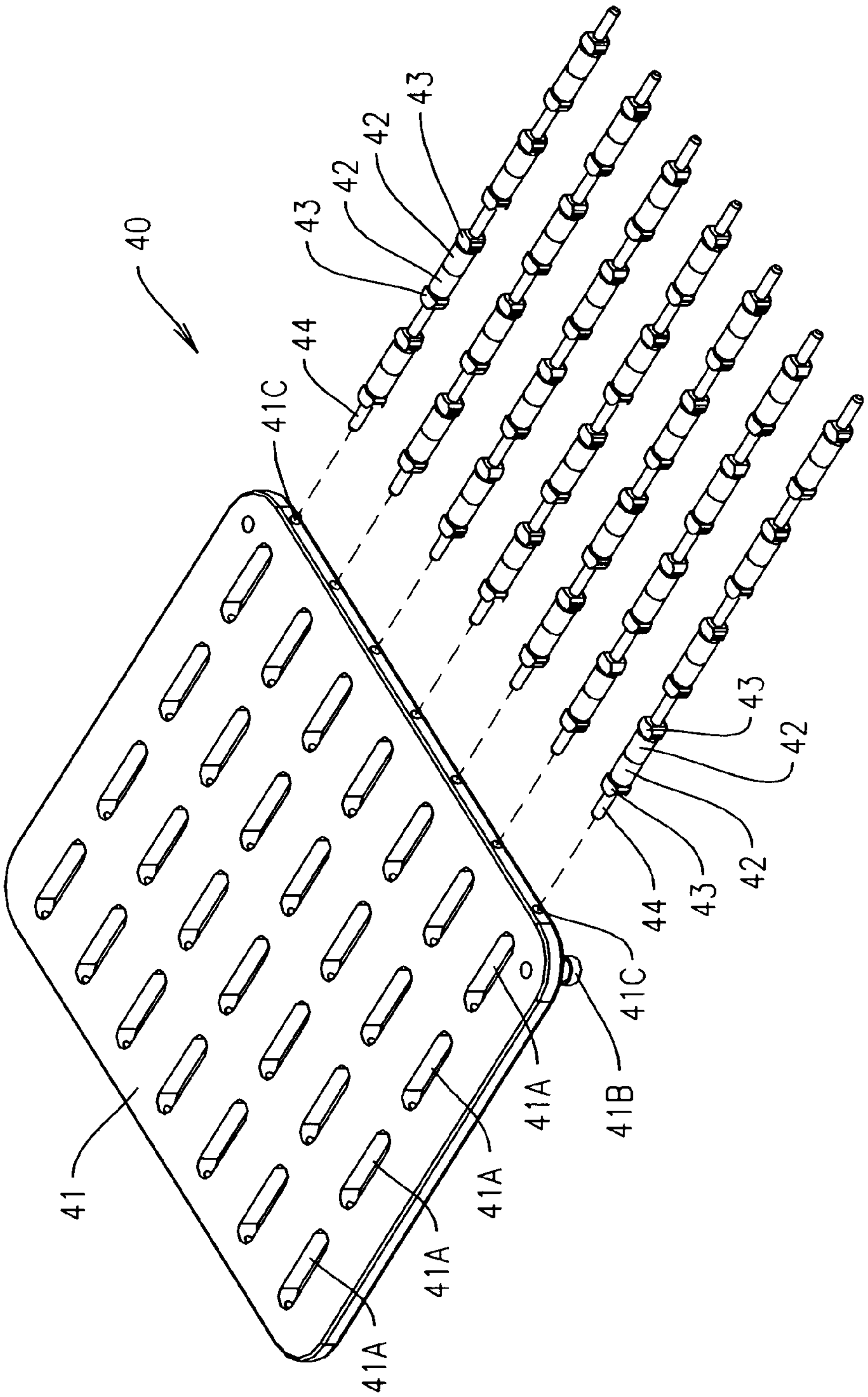
FIG. 9 is an exploded view of the bearing assembly plate of the present invention.

FIG. 9 illustrates the exploded view of the bearing assembly plate 40. As mentioned above, the bearing assembly plate 40 is comprised of the bearing mounting plate 41, which has a preferable number of twenty-eight open slots arranged in seven columns, with the size slightly larger than the diameter of the bearings, to nest twenty-eight bearing sets assembled on seven metal rods 44. The through holes 41C on plate 41 are features for inserting rods 44 and will be punched at both ends, after rods 44 are assembled with the bearing sets in slots 41A, to lock the rod ends. Each bearing set is preferably to have two standard sleeve bearings 42 in the middle and two non-standard end-bushings 43 at ends as shown.

Figure 10:
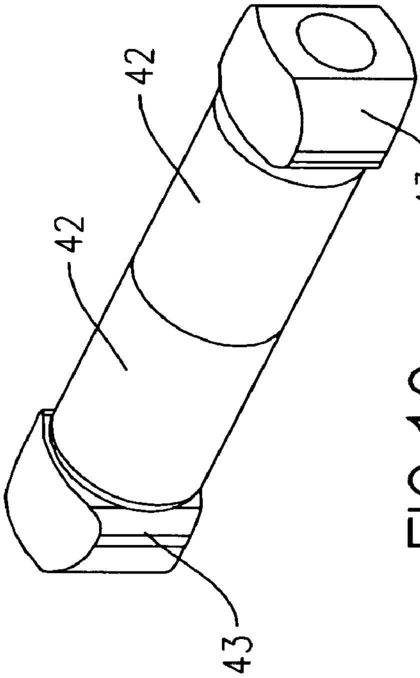
FIG. 10 is an isometric view of one of the bearing sets of the present invention.
Figure 11:
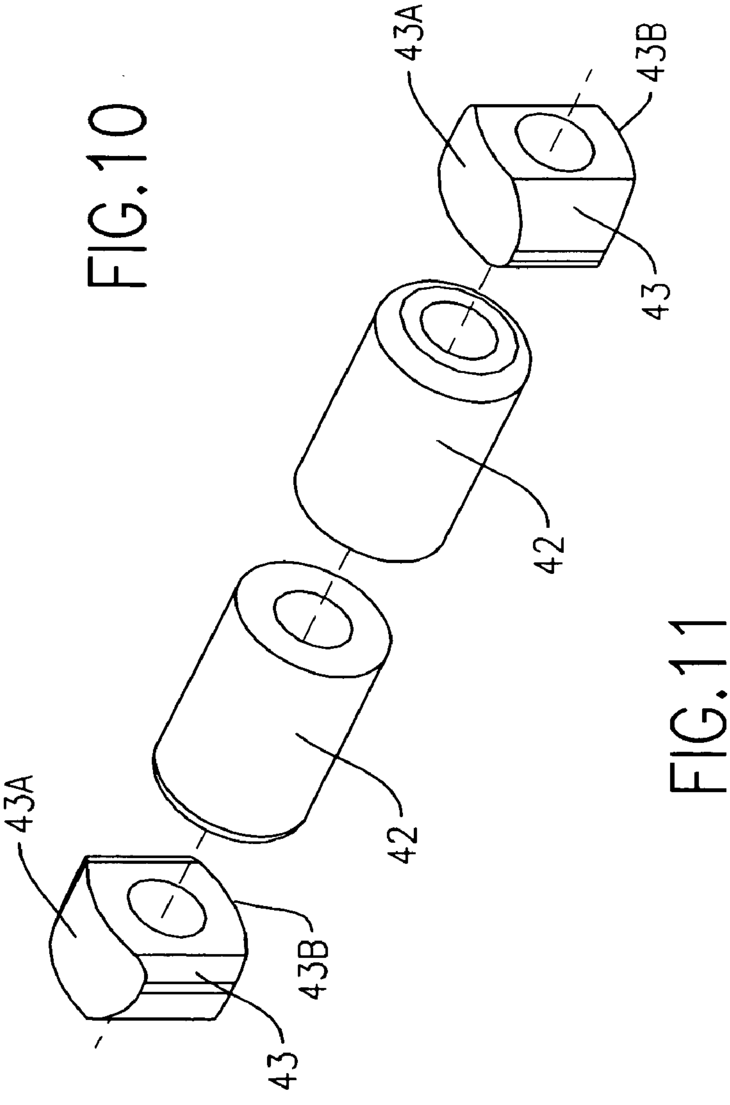
FIG. 11 is an exploded view of one of the bearing sets of the present invention.

FIGS. 10 through 11 illustrate the assembly and the exploded views, respectively, for a typical bearing set of the present invention. To utilize standard bearings and eliminate the possibility of producing powder grindings by the bearings against the ends of the slots, each bearing set is preferably comprised of two standard non-metal sleeve bearings 42 between another two non-standard non-metal end-bushings 43 at the ends. The end-bushing 43 is preferably configured to have a slightly smaller thickness than the diameter of the sleeve bearings 42 but to have the profile shape and width dimension close to that part of the slot, such that when it nests in slot 41A on bearing mounting plate 41 illustrated in FIG. 9, it cannot rotate. The end-bushing 43 is also preferably configured to have convex curved planes 43A and 43B on the upper and lower surfaces, respectively, as illustrates in FIG. 11, or to have at least one convex curved plane 43A on the upper surface to prevent sharp corners created in the slot area in which it is nested. Knowing that a slight rotary movement in position will cause an end-bushing with a flat upper surface to expose its sharp corners above the surface of plate 41 illustrated in FIG. 9, the body size of end-bushing 43 should be manufactured smaller than that part of the slot in which it nests for easy assembly.

I claim as my invention:

1. A food slicer roller bearing feeding device, comprising:

a bearing mounting plate having multiple open slots arranged for nesting multiple roller bearing sets;

said multiple roller bearing sets being of a size for placing in said open slots of said bearing mounting plate; and a housing table assembly having a recess to precisely nest said bearing mounting plate.

2. The food slicer roller bearing feeding device of claim 1 wherein said bearing mounting plate includes multiple pins for engaging with multiple mating holes on said housing table assembly.

3. The food slicer roller bearing feeding device of claim 2 wherein said multiple pins include at least one neck-pin having a body, a part of said body being smaller in size than the rest of said body.

4. The food slicer roller bearing feeding device of claim 3 wherein the mating holes includes at least one keyhole, said at least one keyhole having a shape for inserting and locking said at least one neck pin.

5. The food slicer roller bearing feeding device of claim 1 wherein said housing table assembly includes a thin metal plate with a cutout and a thick metal plate with a recess to define a cavity, the thin metal plate and the thick metal plate are assembled together with the cavity precisely nesting the bearing mounting plate assembly.

6. The food slicer roller bearing feeding devise of claim 5 wherein said housing table assembly further includes a small cutout space connecting an upper part of the cavity for access to the bearing mounting plate, to separate the bearing mounting plate from the cavity.

* * * * *